United States Patent
Peyruseigt et al.

(10) Patent No.: US 9,688,412 B2
(45) Date of Patent: Jun. 27, 2017

(54) AERODYNAMIC FAIRING

(71) Applicant: Airbus Operations (SAS), Toulouse (FR)

(72) Inventors: Francois Peyruseigt, Toulouse (FR); Thierry Gaches, Castelnau d'Estrefonds (FR); Mathieu Kaleta, Toulouse (FR); Nicolas Voyer, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 540 days.

(21) Appl. No.: 14/501,830

(22) Filed: Sep. 30, 2014

(65) Prior Publication Data

US 2015/0344140 A1    Dec. 3, 2015

(30) Foreign Application Priority Data

Nov. 25, 2013   (FR) ..................................... 13 61555

(51) Int. Cl.
    *B64D 27/00*      (2006.01)
    *B64D 27/26*      (2006.01)
    *B64D 29/02*      (2006.01)

(52) U.S. Cl.
    CPC ............ *B64D 27/26* (2013.01); *B64D 29/02* (2013.01)

(58) Field of Classification Search
    CPC ........ B64D 29/00; B64D 27/26; B64D 29/06; B64D 29/02; B64C 1/0009
    USPC ....................................................... 244/54
    See application file for complete search history.

(56) References Cited

U.S. PATENT DOCUMENTS

| | | | | |
|---|---|---|---|---|
| 4,712,750 A | * | 12/1987 | Ridgwell | B64C 7/02 244/117 A |
| 8,118,252 B2 | * | 2/2012 | Dumont | B64D 33/04 244/130 |
| 8,651,416 B2 | * | 2/2014 | Journade | B64D 27/18 244/54 |
| 8,662,440 B2 | * | 3/2014 | Journade | B64D 33/04 244/121 |
| 2005/0116093 A1 | * | 6/2005 | Machado | B64D 27/12 244/54 |

(Continued)

FOREIGN PATENT DOCUMENTS

| | | | | |
|---|---|---|---|---|
| CA | 2901903 A1 | * | 9/2014 | ............... B64C 7/02 |
| FR | 2913665 | | 9/2008 | |

(Continued)

OTHER PUBLICATIONS

French Search Report, Jun. 27, 2014.

*Primary Examiner* — Brian M O'Hara
*Assistant Examiner* — Assres H Woldemaryam
(74) *Attorney, Agent, or Firm* — Greer, Burns & Crain, Ltd.

(57) ABSTRACT

An aerodynamic fairing whose floor has absolutely no contact with respect to the lateral panels over the entire length of the fairing along the longitudinal axis. A free space e is provided between the floor and the lower edge of each panel. There is a longitudinal mechanical gap between the floor and each of the lateral panels. The absence of any rigid mechanical connection between the floor and the lateral panels allows the transfer of the thermomechanical stresses from the floor to the lateral panels and therefore preventing the deformation of the fairing.

7 Claims, 5 Drawing Sheets

(56) References Cited

U.S. PATENT DOCUMENTS

| | | | | |
|---|---|---|---|---|
| 2008/0217502 A1* | 9/2008 | Lafont | ............ | B64D 27/26 248/554 |
| 2008/0232924 A1* | 9/2008 | Levert | ............ | B64D 27/26 411/263 |
| 2008/0251634 A1* | 10/2008 | Bernardi | ............ | B64D 27/18 244/54 |
| 2010/0051743 A1 | 3/2010 | Dumont et al. | | |
| 2011/0011972 A1* | 1/2011 | Vache | ............ | B64D 27/26 244/54 |
| 2011/0036942 A1* | 2/2011 | Marche | ............ | B64D 27/26 244/54 |
| 2011/0204179 A1* | 8/2011 | Skelly | ............ | B64D 27/26 244/54 |
| 2013/0105622 A1* | 5/2013 | Journade | ............ | B64D 29/02 244/54 |
| 2015/0251768 A1* | 9/2015 | Woolley | ............ | B64D 27/26 244/54 |

FOREIGN PATENT DOCUMENTS

| | | | | |
|---|---|---|---|---|
| FR | EP 2390187 A2 * | 11/2011 | ............ | B64C 7/02 |
| FR | 2960519 | 12/2011 | | |
| FR | 2966803 | 5/2012 | | |
| FR | WO 2012085388 A1 * | 6/2012 | ............ | B64D 27/26 |

\* cited by examiner

AERODYNAMIC FAIRING

CROSS-REFERENCES TO RELATED APPLICATIONS

This application claims the benefit of the French patent application No. 1361555 filed on Nov. 25, 2013, the entire disclosures of which are incorporated herein by way of reference.

BACKGROUND OF THE INVENTION

The present invention relates to an aerodynamic fairing of the rear portion of an aircraft pylon which is also referred to as an "aft pylon fairing" or APF.

Such an aerodynamic fairing is known in particular from the document U.S. Pat. No. 4,712,750. In this document, the aerodynamic fairing is in the form of a casing which comprises two lateral panels which are assembled together by means of frames or transverse inner reinforcement ribs which are spaced apart from each other along the longitudinal axis of the fairing, and a thermal protection floor which is fixed, on the one hand, to the lateral panels and, on the other hand, to the transverse inner ribs with which the floor is in contact.

In a position for use, such a fairing is subjected to very high temperatures which originate from the engine unit of the aircraft. These temperatures bring about deformations as a result of thermal expansions of the fairing, thus disrupting the aerodynamic qualities thereof. In particular, the thermal protection floor is subjected to a primary flow of the turbo engine at high temperature (in the order of 600° C.) while the lateral panels are subjected to a secondary flow of the turbo engine at a relatively low temperature (in the order of 150° C.) in relation to that of the primary flow. These temperature differences bring about significant thermomechanical stresses on the casing.

SUMMARY OF THE INVENTION

An object of the invention is to at least partially overcome the deformation of the structure of the aerodynamic fairing.

The subject-matter of the invention is thus an aerodynamic fairing of a pylon of a turbo engine, the fairing being in the form of a casing which extends along a longitudinal axis and which comprises, on the one hand, a floor and, on the other hand, a first lateral panel and a second lateral panel which are substantially parallel with the longitudinal axis and which are distributed at one side and the other of a plane of symmetry of the fairing, the fairing comprising at least two frames which are spaced apart from each other along the longitudinal axis and which are orientated transversely relative to this axis, each frame having, in a position for use, an upper edge, a lower edge which is fixed to an inner face of the floor and a first lateral edge and a second lateral edge to which the first lateral panel and the second lateral panel are fixed, respectively, each lateral panel having, in a position for use, an edge which is referred to as the lower edge, the floor has a width such that it is substantially less than a distance d defined between the lower edges of the lateral panels so that each lateral panel has the lower edge thereof spaced by a distance e from the inner face of the floor, and the fairing comprises at least one longitudinal reinforcement member which is associated, on the one hand, with the floor and, on the other hand, with the frame.

Each longitudinal reinforcement member comprises
a first face which is fixed to a face of a frame, the face of the frame extending transversely to the longitudinal axis, and;
a second face, which is substantially perpendicular to the first face and which is fixed to the inner face of the floor.

Preferably, the fairing further comprises at least one transverse reinforcement member which is fixed to the inner face of the floor and which extends in a plane perpendicular to the longitudinal axis.

The distance e is such that 0<e<5 cm, with e preferably being from 0.3 mm to 1 cm.

Advantageously, each lateral panel comprises an aerodynamic extension which extends each of the lateral panels beyond the lower edge thereof.

A joint may be arranged between the inner face of the floor and each of the lateral panels, the joint extending between two successive frames of the fairing.

Furthermore, each lateral panel may be formed by a plurality of lateral panel portions which are fixedly attached to each other.

Other advantages and features of the invention will be appreciated from the non-limiting detailed description set out below.

BRIEF DESCRIPTION OF THE DRAWINGS

This description will be given with reference to the appended drawings, in which.

DETAILED DESCRIPTION OF THE PREFERRED EMBODIMENTS

Figure 1:
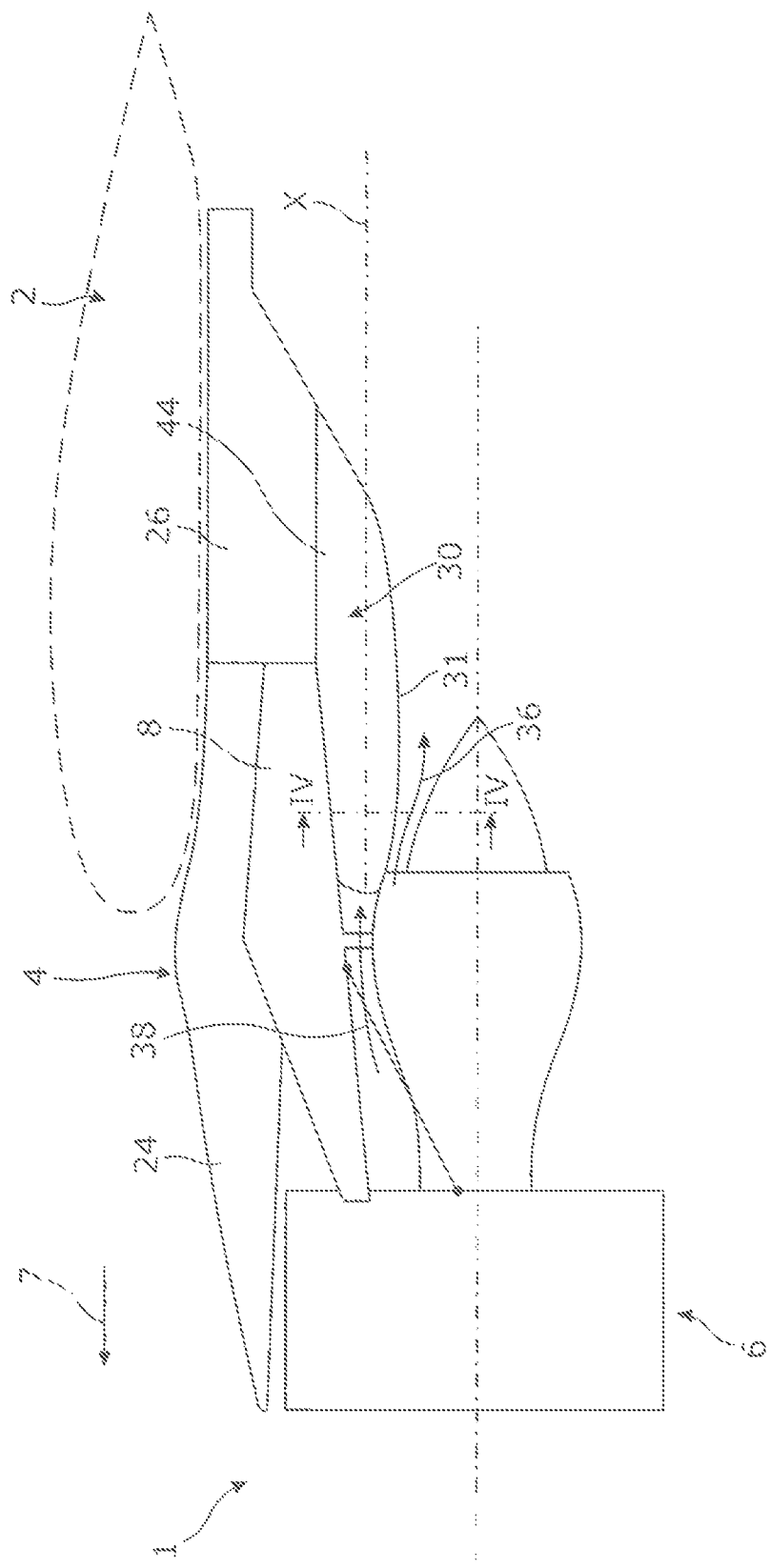
FIG. 1 is a schematic view of an aircraft wing which is provided with an engine pylon and an aerodynamic fairing which is located at the rear portion of the engine pylon and which protects the wing from the hot gases which are discharged by the engine unit.

With reference to FIG. 1, an engine unit 1 which is fixed below a wing 2 of an aircraft is illustrated. The engine unit comprises a pylon 4 and a turbo engine 6, for example, a turbo reactor, which is secured to the wing 2 via the pylon 4.

The pylon 4 comprises in known manner a rigid structure 8, which is also called a primary structure, which allows the turbo reactor 6 to be supported via known means.

Furthermore, the pylon 4 comprises secondary structures of the fairing type. The secondary structures of the pylon 4 include in particular a front aerodynamic structure 24, a rear aerodynamic structure 26 and a rear aerodynamic fairing 30, which is also called an APF or thermal shield. The terms "front" and "rear" are intended to be considered relative to a direction of advance of the aircraft encountered following the thrust applied by the turbo reactor 6, this direction being illustrated schematically by the arrow 7.

Figure 2:
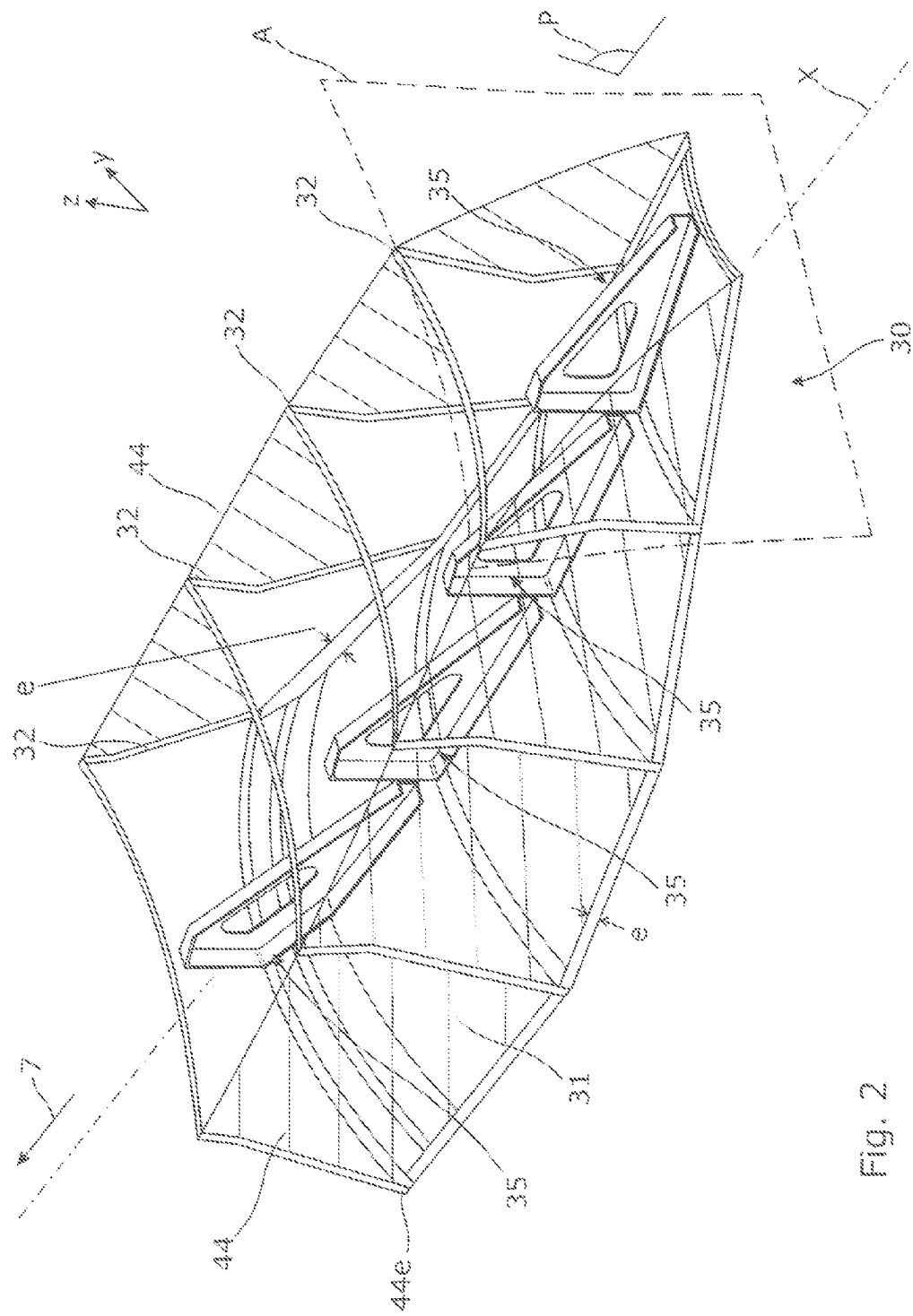
FIG. 2 is a schematic, perspective view of the rear aerodynamic fairing according to an embodiment of the invention illustrated in FIG. 1.
Figure 3:
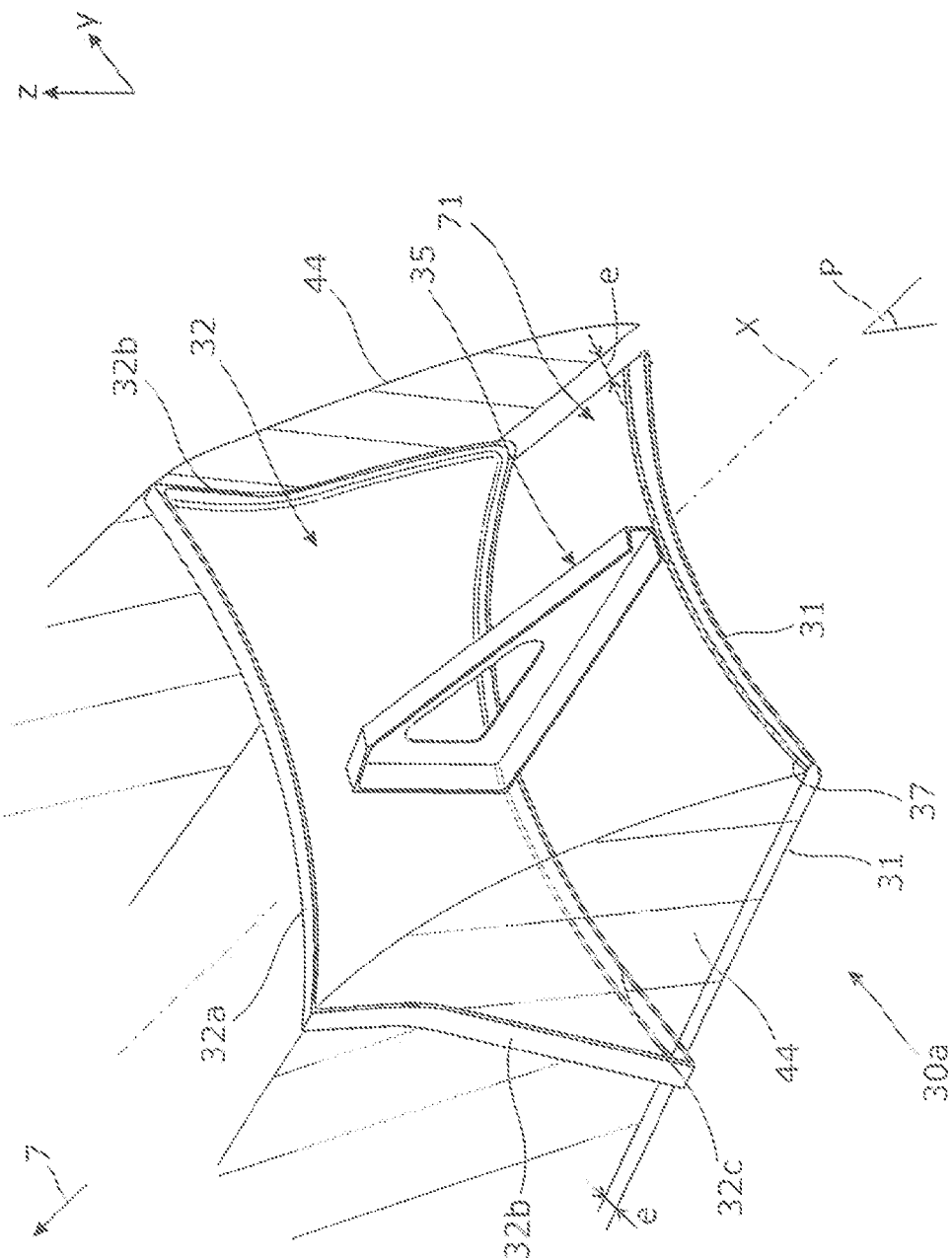
FIG. 3 is a view to a larger scale of a portion A of FIG. 2.
Figure 4:
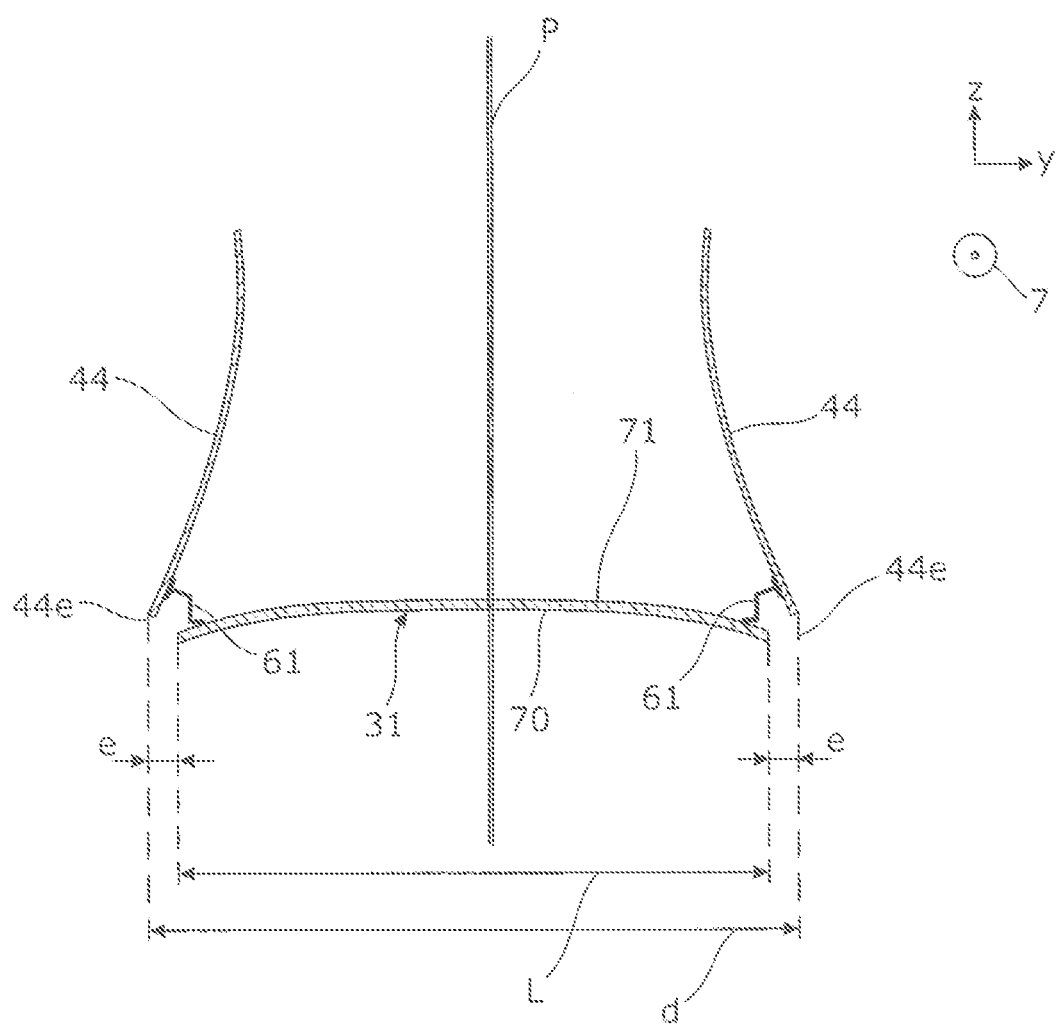
FIG. 4 is a cross-section, along line IV-IV, in a transverse plane (plane YZ) of the aerodynamic fairing illustrated in FIG. 1.

As illustrated in FIGS. 2 to 4, the rear aerodynamic fairing 30 is in the form of a casing which is open in an upward direction, that is to say, in the direction of the other structures of the securing device on which the casing is intended to be mounted, that is to say, the rear aerodynamic structure 26 and the rigid structure 8.

Conventionally, the longitudinal axis of the rear aerodynamic fairing 30 is called X. On the other hand, Y is used to refer to the axis which is orientated transversely relative to the turbo reactor 6 and the rear aerodynamic fairing, and Z to refer to the vertical axis or height, these three axes X, Y and Z being mutually orthogonal.

A thermal protection floor 31 forms the lower portion of the casing while the two sides (in the longitudinal axis X) of the casing are formed by two lateral panels 44. The rear aerodynamic fairing 30 further comprises a reinforcement member, described in the remainder of the description, which allows the lateral panels 44 and the floor 31 to be held together.

It should be noted that, as illustrated in FIG. 2, the rear aerodynamic fairing 30 is not planar in the plane XZ and is substantially in the form of an arrow (whose tip is orientated toward the rear) in the plane XY. This is because the rear aerodynamic fairing 30 is shaped so as to assume the shape of the pylon 4 to which it is intended to be fixed. The rear aerodynamic fairing 30 is closed by a frame 32 at the front end thereof and, at the rear end thereof, it is closed by the floor 31 which is inclined in the plane YZ.

On the other hand, it should be noted that, in the plane YZ, the floor 31 has a curved shape which opens toward the outer side or a shape which is concave with respect to the rear aerodynamic fairing 30.

One of the specific features of the present invention is that the floor 31 of the fairing has absolutely no contact with respect to the lateral panels 44 over the entire length of the rear aerodynamic fairing 30 along the longitudinal axis X. This is because, in the plane YZ, a distance (space) e which is not equal to zero is provided between the floor 31 and the lower edge 44e of each lateral panel 44 (the lower edge of each panel 44 being extended in the manner of the edge of the lateral panel closest to the floor 31). In other words, this is equivalent to ensuring that there is a longitudinal mechanical gap between the floor 31 and each of the lateral panels 44.

As illustrated more specifically in FIG. 4, in the YZ plane, the width L of the floor 31 is less, for example, by a distance equal to 2×e (two times e) than the distance d between the lower edges 44e of the lateral panels. The distance e is such that $0 < e < 5$ cm, with e preferably being from 0.3 mm to 1 cm (these two values being inclusive).

It should be noted in FIGS. 2 to 4 that the rear aerodynamic fairing 30 has a plane of symmetry P which corresponds to a plane XZ. The floor 31 is provided with an outer face which is designated 70 in FIG. 4, this face being intended to be followed by the primary flow 36 which it partially delimits radially at the outer side. In order to withstand the thermal stresses, the floor 31 is preferably produced from Inconel®, or an equivalent titanium alloy.

As illustrated in FIGS. 2 and 3, the armature of the rear aerodynamic fairing 30 comprises frames 32 and longitudinal reinforcement members 35 which are fixed to the frames 32. There are as many frames and longitudinal reinforcement members as necessary in order to form the rear aerodynamic fairing 30 according to desired dimensions. In the example illustrated in FIG. 2, four frames 32 and four longitudinal reinforcement members 35 are illustrated.

A frame 32 is in the form of a structural panel, which is preferably produced from titanium and which extends in the plane YZ and which comprises four edges. In the example illustrated in FIGS. 2 to 4, the frame 32 is in the form of an isosceles trapezium in the plane YZ. The two lateral edges 32b of the frame 32 are each intended to receive a lateral panel 44 as will be described in greater detail below. The upper edge 32a of some frames 32 (in the case where only some frames are fixed to structures of the pylon) or of all the frames 32 (in the case where all the frames are fixed to structures of the pylon) is arranged so as to correspond to another structure of the pylon 4 to which it is fixed, that is to say, for example, the rear aerodynamic structure 26 or the rigid structure 8. The lower edge 32c of each frame is fixed to the inner face 71 of the floor 31, for example, by means of splicing connection. The lower edge 32c of a frame 32 corresponds to the floor 31 and therefore has, as illustrated in FIG. 4, in a cross-section of the rear aerodynamic fairing 30, a curved shape which opens toward the outer side relative to the rear aerodynamic fairing 30. In order to withstand the thermal stresses, a frame 32 is preferably produced from Inconel® or from an equivalent titanium alloy.

In the example illustrated in FIGS. 2 and 3, a longitudinal reinforcement member 35 of the rear aerodynamic fairing (along the longitudinal axis X) is in the form of an angled member 35. As illustrated in FIG. 3, this angled member 35 comprises a first face in the plane YZ and a second face in the plane XY. The first face of the angled member 35 is fixed to a frame 32, for example, by means of screwing, while the second face is fixed to the inner face 71 of the floor 31, for example, also by means of screwing or welding.

With reference more specifically to FIGS. 2 and 4, each lateral panel 44 of the rear aerodynamic fairing 30 extends substantially in the plane XZ and the two lateral panels 44 are distributed at one side and the other of the plane of symmetry P of the casing. Each lateral panel 44 is fixedly mounted with respect to the lateral edges 32b (located at the same side of the plane P) of the successive frames 32. To this end, each lateral panel 44 is fixed to a lateral edge 32b of a frame 32 by means of screwing directly to the lateral edge 32b, or is screwed to an intermediate component (not illustrated in the Figures) which is itself screwed to the lateral edge 32b. It is possible to size the intermediate component in order to increase the distance e.

During use, the lateral panels 44 are provided so as to be followed externally by the secondary flow 38.

The lateral panels 44 are, for example, produced from titanium and have a thickness in the order of from 1 mm to 7 mm. In the example illustrated in FIG. 2, the lateral panels 44 extend, each in one piece, from the front to the rear of the rear aerodynamic fairing 30. In this configuration, the panels 44 allow the rear aerodynamic fairing 30 to be reinforced since they are fixed to each of the frames 32 of the fairing 30.

In order to maintain efficient separation between the primary flow 36 which flows below the floor 31 and the air contained in the fairing 30, that is to say, in order to prevent the primary flow 36 having a temperature close to 600° C. from rising and propagating within the fairing 30, joints 61 are provided between the floor 31 and each lateral panel 44. With reference to FIG. 4, each joint 61 has a first face which is fixed to the inner face 71 of the floor 31 and a second face which is fixed to the lateral panel 44. Each joint 61 extends over the entire length, along the longitudinal axis X, between two successive frames 32 of the fairing 30.

When the turbo reactor 6 is operational, the rear aerodynamic fairing 30 ensures the formation of a thermal barrier which serves to protect the structure 8 and the wing 2 of the aircraft from the heat released by the primary flow 36, and the formation of thermal continuity between the outlet of the turbo reactor 6 and the pylon 4. According to the invention, the hot portion of the rear aerodynamic fairing 30, that is to say, the floor 31, is completely mechanically insulated from the cold portions 44, that is to say, the lateral panels 44.

In this manner, the absence of fixing between the floor 31 and the lateral panels 44 enables the transfer of the thermomechanical stresses of the floor 31 to the lateral panels 44 to be prevented. The lateral panels 44 are immersed in the relatively cold secondary flow 38 so that they are subjected to only a very small amount of deformation owing to thermal expansion. In this manner, the general level of deformation of the aerodynamic fairing 30 is therefore kept relatively low, which brings about a very satisfactory aerodynamic quality, which contributes to the reduction of the effects of parasitic drag and the improvement of the performance/consumption ratio of the aircraft.

The absence of fixing between the floor 31 and the lateral panels 44 is compensated for by means of the angled members 35 which allow reinforcement of the structure of the fairing 30 and in particular the connection between the floor and the frames 32 in order to better withstand the mechanical stresses, in particular sound vibrations, to which the floor 31 is subjected.

Figure 5:
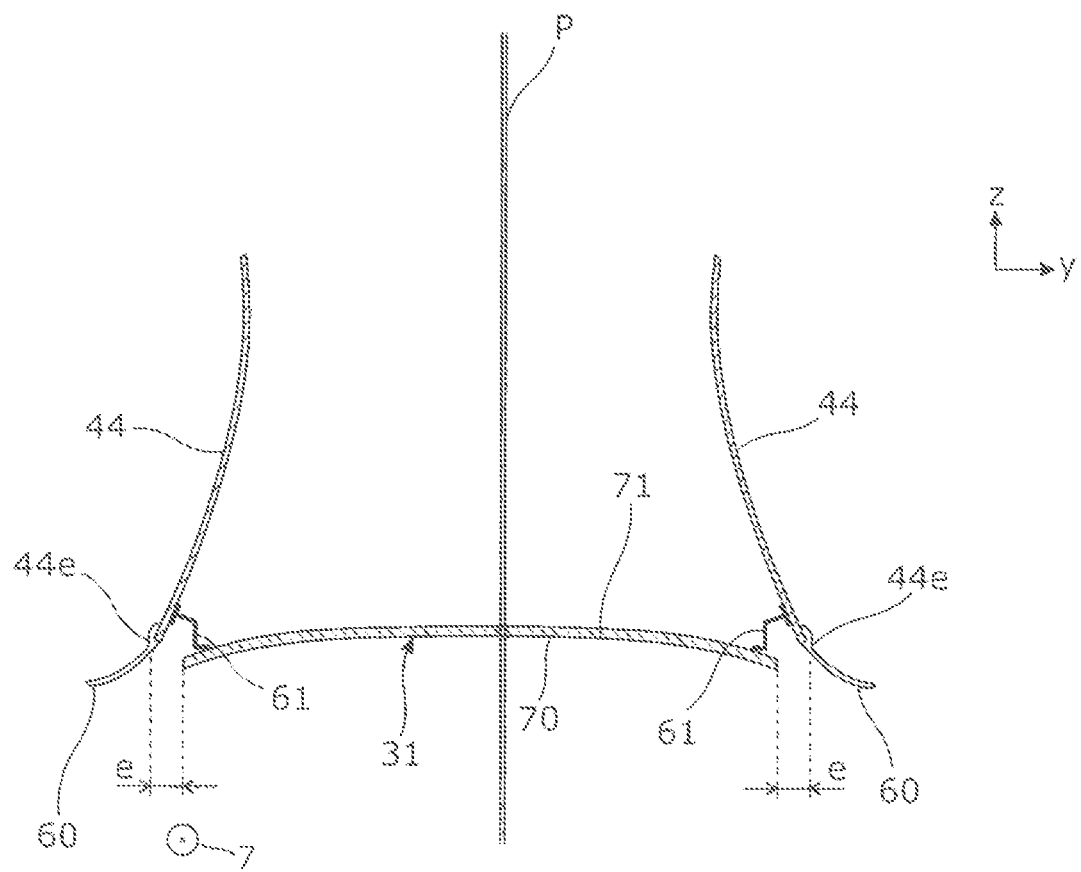
FIG. 5 is a view similar to FIG. 4, illustrating a production variant of the aerodynamic fairing of FIG. 2.

In a first variant of the embodiment which has been described, and with reference to FIG. 5, each lateral panel 44 is provided with an aerodynamic extension 60. An aerodynamic extension 60 has a thickness of a few millimeters, extending each lateral panel 44 beyond the lower edge 44e thereof. In the plane YZ, an aerodynamic extension 60 has a curved shape and extends the curve formed by the floor 31.

This aerodynamic extension 60 is fixed to a panel 44, for example, by means of screwing or welding, and is produced from a material, for example, a titanium alloy, which has a strength which is different from that of the titanium used to produce the panels 44. This is because it is advantageous to use different materials and thicknesses in order to produce the panels 44 and the aerodynamic extensions 60 in order to optimize the thermal and acoustic functions of the casing.

The advantage afforded by this variant is to protect the rigid structure 8, the rear aerodynamic structure 26 and the wing 2 of the aircraft from the heat released by the primary flow 36 by preventing the flow from rising above the floor 31.

In a second variant (not illustrated) of the embodiment which has been described above, the lateral panels 44 are formed by a plurality of lateral panel portions which are fixedly attached to each other. A portion of lateral panel being fixed to a first frame and a second frame which is directly or indirectly consecutive with the first frame.

This second variant has the advantage of simplifying the assembly of the rear aerodynamic fairing 30.

It should be noted that, in the example of FIG. 3, each angled member 35 is arranged so that the second face thereof is substantially in the plane of symmetry P in order to allow better distribution of the stresses to which the rear aerodynamic fairing 30 is subjected.

However, in a third variant (not illustrated) of the embodiment described above, a plurality of angled members 35 are fixed both to each of the frames 32 and to the floor 31 in order to form supplementary longitudinal reinforcement members of the rear aerodynamic fairing 30 along the longitudinal axis X.

In a fourth variant (not illustrated in the Figures) of the embodiment which has been described above, the angled member(s) 35 are positioned at variable distances from the plane of symmetry P. The advantage afforded by this variant is to reduce the extents of potential vibrations, which are capable of bringing about noise disruptions.

Furthermore, in a fifth variant (not illustrated in the Figures) of the embodiment which has been described above, at least one frame/floor assembly of the rear aerodynamic fairing 30 is not reinforced by one or more angled members. The advantage afforded by this variant is a saving of weight.

With reference to FIG. 3, and in a sixth variant of the embodiment which has been described above, the floor 31 comprises at least one transverse reinforcement member 37 (only 1 illustrated in FIG. 3) which is in the form of a metal profile-member which extends transversely relative to the floor 31, that is to say, in the plane YZ. A metal profile-member is fixed, for example, by means of screwing, to the inner face 71 of the floor 31. A metal profile-member is produced from a material which is suitable for the high temperatures and resistant to the expansions, for example, from the same material as the floor.

A transverse reinforcement member 37 reinforces the floor 31 which is subjected to significant vibration stresses when the turbo engine 6 operates. A transverse reinforcement member 37 allows the rigidity of the floor 31 to be increased in order to better withstand the mechanical stresses. A transverse reinforcement member 37 follows the expansion of the floor 31 without bringing about additional thermomechanical stresses with respect to the rear aerodynamic fairing 30.

In the Figures which are appended to the above description, each frame 32 has been illustrated as being a solid panel. It is self-evident that, without departing from the scope of the present invention, a frame 32 may also have a hollow shape so as to reduce the weight of the rear aerodynamic casing 30 which is provided with such frames.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aerodynamic fairing of a pylon of a turbo engine, the fairing comprising:
    a casing which extends along a longitudinal axis and which comprises:
        a floor and,
        a first lateral panel and a second lateral panel which are substantially parallel with the longitudinal axis and which are distributed at one side and the other of a plane of symmetry of the fairing,
    at least two frames which are spaced apart from each other along the longitudinal axis and which are orientated transversely relative to the longitudinal axis,
    each frame having, in a position for use, an upper edge, a lower edge which is fixed to an inner face of the floor and a first lateral edge and a second lateral edge to which the first lateral panel and the second lateral panel are fixed, respectively, wherein,
    each lateral panel having an edge which is referred to as the lower edge,
    the floor having a width substantially less than a distance d defined between the lower edges of the lateral panels so that each lateral panel has the lower edge thereof spaced by a distance e from the inner face of the floor, and at least one longitudinal reinforcement member which is associated with the floor and with at least one of the at least two frames.

2. The fairing as claimed in claim 1, wherein each longitudinal reinforcement member comprises:
- a first face which is fixed to a face of one of the at least two frames, the face of the one of the at least two frames extending transversely to the longitudinal axis, and
- a second face, which is substantially perpendicular to the first face and which is fixed to the inner face of the floor.

3. The fairing as claimed in claim 1, wherein the fairing further comprises at least one transverse reinforcement member which is fixed to the inner face of the floor and which extends in a plane perpendicular to the longitudinal axis.

4. The fairing as claimed in claim 1 wherein the distance e is such that $0<e<5$ cm.

5. The fairing as claimed in claim 1, wherein each lateral panel comprises an aerodynamic extension which extends each of the lateral panels beyond the lower edge thereof.

6. The fairing as claimed in claim 1, wherein a joint is arranged between the inner face of the floor and each of the lateral panels, the joint extending between two successive frames of the fairing.

7. The fairing as claimed in claim 1, wherein each lateral panel is formed by a plurality of lateral panel portions which are fixedly attached to each other.

* * * * *